United States Patent [19]
Balog et al.

[11] 3,950,301
[45] Apr. 13, 1976

[54] LIGHT STABILIZED POLYESTER RESIN COMPOSITION

[75] Inventors: Karl J. Balog; Donald I. Craft, both of Pittsfield, Mass.

[73] Assignee: General Electric Company, Pittsfield, Mass.

[22] Filed: Aug. 1, 1974

[21] Appl. No.: 493,683

[52] U.S. Cl. ........ 260/40 R; 260/45.8 NT; 260/860; 260/DIG. 24
[51] Int. Cl.² ...................... C08K 5/27; C08L 67/02
[58] Field of Search ..... 260/45.8 NT, DIG. 24, 860, 260/40 R

[56] References Cited
UNITED STATES PATENTS

| | | | |
|---|---|---|---|
| 3,213,058 | 10/1965 | Boyle et al. | 260/45.8 NT |
| 3,413,379 | 11/1968 | Schode et al. | 260/860 |
| 3,632,552 | 1/1972 | Smid et al. | 260/45.8 NT |
| 3,671,487 | 6/1972 | Abolins | 260/40 R |
| 3,723,572 | 3/1973 | Reese et al. | 260/860 |
| 3,742,087 | 6/1973 | Nield | 260/860 |
| 3,751,396 | 8/1973 | Gall | 260/40 R |
| 3,766,205 | 10/1973 | Heller et al. | 260/45.8 NT |
| 3,781,242 | 12/1973 | Mathis et al. | 260/45.8 NT |
| 3,833,535 | 9/1974 | Wambach | 260/40 R |
| 3,833,685 | 9/1974 | Wambach | 260/DIG. 24 |
| 3,835,089 | 9/1974 | Fox et al. | 260/860 X |

Primary Examiner—Donald E. Czaja
Assistant Examiner—S. M. Person
Attorney, Agent, or Firm—Donald M. Papuga; William F. Mufatti

[57] ABSTRACT

Ultraviolet light stable polyester resin compositions are provided by this invention. These compositions include as the stabilizer system, a stabilizing amount of a hydroxybenzotriazole ultraviolet light absorber.

35 Claims, No Drawings

LIGHT STABILIZED POLYESTER RESIN COMPOSITION

This invention provides ultraviolet light stabilized polyester compositions that include a stabilizing amount of a hydroxybenezotriazole ultraviolet light absorber.

BACKGROUND OF THE INVENTOR

High molecular weight linear thermoplastic polyesters, such as poly (ethylene terephthalate and poly(1,4-butylene terephthalate) are well known as film and fiber-formers and they are provided by methods outlined in Whinfield et al. U.S. Pat. No. 2,465,319, and Pengilly, U.S. Pat. No. 3,047,539, and elsewhere.

Polyester resins, such as poly(alkylene terephthalates, isophthalates and mixed iso - and terephthalates), particularly poly(1,4-butylene terephthalate), also provide excellent molding composition because they can be fabricated with moderate stock temperatures, low mold temperatures and rapid cycle times. Because of their unusual combination of properties, these resins are superior in chemical resistance, thermal stability and product appearance (they have a smooth, glossy finish). Such resins also have superior strength, stiffness, low friction and wear properties and good resistance to brittle fracture. The polyester resins can also be provided in reinforced and flame retardant embodiments.

Solid polyester resins of the type mentioned have found extensive use in various forms of thermoplastic structures. Many different articles of manufacture are produced from polyester compositions by molding extrusion and shaping at higher temperatures because they remain relatively rigid at ordinary room temperature. Polyester fibers are also useful in woven articles and films therefrom are both useful as mechanical supports and as barriers and also they have useful protective coating applications. Although the thermoplastic molding extruded, extrusion blown, injection blown, and coating compositions have the outstanding properties mentioned above, they unfortunately are prone to attack by exposure to light, e.g., UV light. Deterioration caused by UV light which leads to discoloration, embrittlement, and especially loss of physical properties such as tensile strength, tensile elongation and impact strength.

It has now been found that surprisingly stable compositions of polyester resins, with desirable retention of color and physical properties after exposure to UV light are produced when there is admixed therewith a stabilizing amount of a hydroxybenzotriazole ultraviolet light absorber stabilizer.

DESCRIPTION OF THE INVENTION

According to the present invention, there is provided a composition which is stabilized to degradation by ultraviolet light. The stabilized composition comprises a thermoplastic resin, which comprises a normally unstable polyester resin that is stabilized with a stabilizing amount of a hydroxybenzotriazole ultraviolet light absorber. The polyester resin can include a reinforcing amount of a reinforcing filler, a flame retardant additive or a combination of a reinforcing amount of a reinforcing filler and a flame retardant additive.

The polyesters of the instant invention are high molecular weight polycondensation products of a difunctional organic alcohol or reactive derivative thereof and a difunctional organic acid or a reactive derivative thereof. The difunctional alcohol and the difunctional acid can be wholly aliphatic or wholly aromatic or partially aliphatic and partially aromatic in character, the organic groups being straight chained, or branched, cyclic or polycyclic and containing from 2 to 20, preferably from 2 to 10, especially preferably from 2 to 6, carbon atoms.

The polyester resin of the instant invention may include repeating units of the formula

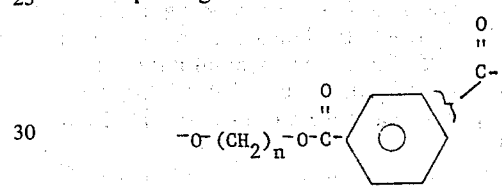

wherein $n$ is a whole number from 2 to 6.

Processes for preparing such polyesters will be well known to those skilled in the art. The descriptions in U.S. Pat. Nos. 2,465,319 and 3,047,539 are helpful. A description is also included herein.

A poly(ethylene terephthalate) resin of the instant invention is disclosed in Whinfield et al., U.S. Pat. No. 2,465,319. Such polymeric linear terephthalic esters are composed of recurring structural units of the formula

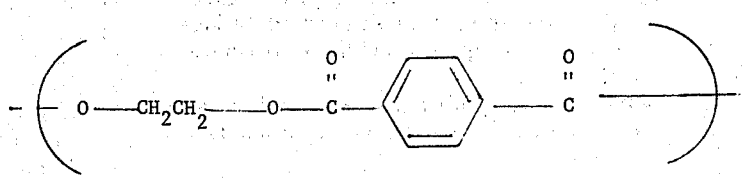

Such polyesters will have molecular weights high enough to have melting points above 200°C. Poly(ethylene terephthalate) resins can be made following the teachings of the Whinfield et al. and Pengilly patent abovementioned, incorporated herein by reference, and are available from a number of sources.

The poly(butylene terephthalate) resin of the instant invention has repeating units of the general formula

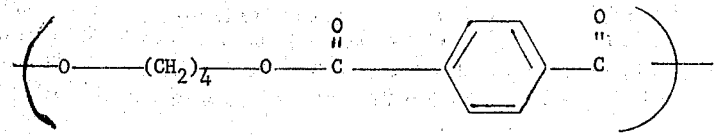

Also contemplated are mixtures of the above esters with minor amounts, e.g., from 0.5 to 2 percent by weight, of units derived from aliphatic or aromatic dicarboxylic acids and/or aliphatic polyols, e.g., glycols, i.e., copolyesters. These can also be made following the teachings of the Pengilly and Whinfield et al. patents above mentioned, suitably modified, if necessary.

Among the units which can be present in the copolyesters are those derived from aliphatic dicarboxylic acids, e.g., of up to about 50 carbon atoms, including cycloaliphatic, straight and branched chain acids, such as adipic acid, cyclohexanediacetic acid, dimerized $C_{16}$–$C_{18}$ unsaturated acids (which have 32 to 36 carbon atoms), trimerized such acids, and the like. Among the units in the copolyesters can also be minor amounts derived from aromatic dicarboxylic acids, e.g., of up to about 36 carbon atoms, such as isophthalic acid and the like. In addition to the 1,4-butylene glycol units, there can also be minor amounts of units derived from other aliphatic glycols and polyols, e.g., of up to about 50 carbon atoms, including glycerol, cyclohexanediol, and the like. Also included are the units derived from HO—(—CH$_2$CH$_2$O—)$_n$H wherein n is 7 to about 50.

Illustratively, sufficiently high molecular weight polyesters of both types, i.e., from poly(ethylene terephthalate) and poly(1,4-butylene terephthalate) will have an intrinsic viscosity of at least 0.2 and preferably about 1.0 deciliters/gram as measured in o-chlorophenol, a 60/40 phenoltetrachloroethan mixture or a similar solvent at 25 –30°C. The upper limit is not critical, but it will generally be about 2.5 dl./g. Especially preferred polyesters will have an intrinsic viscosity in the range of 0.5 to 1.3.

Poly(ethylene terephthalate) resins and poly(1,4-butylene terephthalate) and/or copolyester resins are combinable with each other in all proportions. Consequently, alloyed combinations comprising from 1 to 99 parts by weight of poly(ethylene terephthalate) and from 99 to 1 part by weight of poly(1,4-butylene terephthalate)resin are included within the scope of the invention. In general, however, compositions containing from about 10 to about 90, and especially from about 20 to about 80, parts by weight of poly(ethylene terephthalate) and from about 90 to about 10, and especially from about 80 to about 20, parts by weight of poly(1,4-butylene terephthalate) resins exhibit the best overall combination of properties and these concentrations are preferred.

Poly(1,4-butylene terephthalate) resin and/or copolyester resins are combinable with a linear aliphatic resin.

The linear aliphatic resins may be of the family having repeating units of the general formula +O—R—CO+ 

wherein R is divalent alkylene of, e.g., from 2 to 30 carbon atoms, straight chain and branched, and the number of repeating units is such that the average molecular weight is up to about 100,000.

Linear aliphatic polyesters which may be included are derived from aliphatic dibasic acids of the general formula HOOC—(—CH$_2$—)$_n$—COOH wherein n is from about 4 to about 10 and aliphatic glycols of the formula HO—CH$_2$)$_n$—OH wherein n is from about 2 to about 10.

This polyester component may also be of the general formula

+O—(—CR$^1$R$^2$—)$_m$CO—)$_n$ 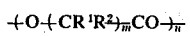

wherein R$^1$ and R$^2$ are hydrogen or alkyl, e.g., methyl or ethyl, m is, for example, 2–5, and n is from about 25 to about 1500. Especially preferred compounds within this family will comprise those in which R$^1$ and R$^2$ are each hydrogen, or are methyl or ethyl on the carbon adjacent to the linking oxygen atom. The most preferred such polyesters are poly(beta-propiolactone), poly(gamma-butyrolactone), poly(delta-valerolactone), poly (epsiloncaprolactone) or mixtures of at least two of them. The best balance of properties appears to result from the use of poly(epsilon-caprolactone) and this is preferred.

This polyester resin component can be made in known ways. For example, by polymerizing the corresponding lactone:

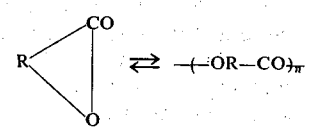

where R and n are as above defined. The reaction can be spontaneous or will proceed on heating, depending on the lactone, but it is best to use a catalyst or an initiator, e.g., cationic or anionic, organic tertiary bases, alkali and alkaline earth metals, hydrides, alkoxides, alkyls, a coordination compound, or a hydrogen donor, e.g., a carboxylic acid, alcohol, glycol, primary and secondary amine or an alkanol amine. Depending on the lactone, polymerization will occur at −20° to 200°C., in bulk or with melts or solutions of the monomer in an inert solvent. It is preferred to use well dried materials and highest molecular weights are obtained with carefully purified monomers, e.g., those distilled from isocyanates.

By way of illustration, epsilon-caprolactone, after purification by distillation from 2% toluene diisocyanate, is treated with 0.001 mole of acetyl perchlorate/-mole of monomer and polymerizes in 68 hours to a 60 percent yield of high molecular weight poly(epsilon-caprolactone), intrinsic viscosity about 1.02 dl./g. (in benzene at 20°C., 10 g./l.). With an anionic initiator, aluminum triethyl, 0.01 mole/mole of monomer, purified epsilon-caprolactone polymerizes in 21 hours to a 72.5 percent yield of polymer, intrinsic viscosity, 0.675 dl./g. (in benzene at 20°C., 10 g./l.). Instead of acetyl perchlorate, other cationic initiators can comprise trifluoroacetic acid and trifluoroacetic anhydride/AlCl$_3$ (1:2). Instead of aluminum triethyl, other anionic initiators which can be used comprise metallic sodium, sodium-naphthalene, and the like.

Entirely analogous procedures can be used to polymerize the corresponding other lactones: beta-propiolactone, gamma-butyrolactone and delta-valerolactone.

Two other useful methods comprise heating a mixture of 675 parts of epsilon-caprolactone, 325 parts of mixed epsilon-methyl-epsilon-caprolactone, 29 parts of ethylene glycol and 0.5 parts of dibutyltin oxide at 170°C for 17 hours under nitrogen. This produces a methyl substituted, unsubstituted copolyester or mixture. Alternatively, a mixture of 600 parts of epsilon-caprolactone, 33.4 parts of hexamethylene diamine and 0.3 parts of dibutyltin oxide can be heated at 170°C under nitrogen for 24 hours. The products are recovered in known ways.

Further details on preparative procedures for this polyester component may be obtained by reference to The Encyclopedia of Polymer Science and Technology, Vol. 11, John Wiley and Sons, Inc., New York, 1969, p. 98–101; H. Cherdron et al., Makromol. Chem. 56, 179–186 and 187–194 (1962); U.S. Pat. Nos. 2,933,477 and 2,933,478.

Illustratively, sufficiently high molecular weights for the linear aliphatic polyester resin component (b) will be provided if the reduced viscosity is at least about 0.1 and preferably about 0.3, as measured in benzene at 2 g./l. at 30°C. The upper limit is not critical but will generally be about 2.0. The preferred polyesters will have from about 100 to about 1000 average repeating units. For poly(epsilon-caprolactone), the most preferred reduced viscosity range will be about 0.3 to 0.7. However, especially preferred polymers will have about 300 to 400 repeating units in the average chain — for poly(epsilon-caprolactone), the corresponding reduced viscosity will range around 0.65–0.75, in benzene at 30°C.

Although the poly(1,4-butylene terephthalate) and/or copolyester resins and the linear aliphatic polyester resins are combinable with each other in all proportions, because major proportions of the latter cause adverse effects on heat distortions and stiffness, only compositions 99 to 60 parts by weight of the poly(1,4-butylene terephthalate) resin and from 1 to 40 parts by weight of the linear aliphatic polyester resin component are included within the scope of the invention. In general, however, compositions containing from about 75 to about 99, and especially from about 85 to about 99, parts by weight of poly(butylene terephthalate) resin and from about 25 to about 1, and especially from about 15 to about 1, parts by weight of the linear aliphatic polyester resin component exhibit the best overall combination of properties and these concentrations are preferred.

Branched polyesters are also within the scope of this invention.

The branching component used in the polyesters will contain at least three ester forming groups. It can be one which provides branching in the acid unit portion of the polyester, or in the glycol unit portion, or be a hybrid. Illustrative such branching components are tri or tetracarboxylic acids, such as trimesic acid, pyromellitic acid and lower alkyl esters thereof, and the like, or, preferably, polyols, and especially preferably tetrols, such as pentaerythritol, triols, such as trimethylolpropane, or dihydroxy carboxylic acids and hydroxydicarboxylic acid and derivatives, such as dimethyl hydroxy-terephthalate, and the like.

The relative amount of the branching component used in the reaction mixture can vary, but is always preferably kept at a minor proportion, e.g., of up to 5 mole % maxium, for every 100 moles of the terephthalate units in the branched polyester. Preferably, the range of branching component included in the esterification mixture (and, generally, that included in the product), will be from 0.05 to 3 mole % based on the terephthalate units. Especially preferably, it will comprise from about 0.1 to about 1 mole %, based on the terephthalate component.

In general, it is convenient to add small amounts of the branching components to the terephthalic acid or ester and an excess of the alkylene glycol in the presence of a conventional polyester catalyst then to heat to form a prepolymer and finally to heat under a high vacuum until the desired degree of polymerization is reached.

The molecular weight of the branched polyester should be sufficiently high to provide an intrinsic viscosity of about 0.6 to 2.0 deciliters per gram, and preferably 0.7 to 1.6 dl./g., measured for example, as a solution in a 60:40 mixture of phenol and tetrachloroethane at 30°C.

Also included within the scope of this invention are the segmented thermoplastic copolyesters. These are described inter alia in U.S. Pat. Nos. 3,723,568; 3,763,109; 3,766,146; 3,775,373; and 3,784,520 which patents are incorporated herein by reference.

Additionally, the compositions encompassed by the instant invention include blends of polyester resins and other polymers in which the polyester constitutes at least 50 weight percent of the mixture. These other polymers include polytetrafluoroethylene, polycarbonates, etc. The compositions may contain a reinforcing amount of a reinforcing filler. In general, any reinforcement can be used, e.g., fibers, whiskers or platelets of metals, e.g., aluminum, iron or nickel, and the like, and non-metals, e.g., ceramics, carbon filaments, silicates, asbestos, $TiO_2$ and titanate whiskers, quartz, glass flakes and fibers polytetrafluoroethylene and the like or mixtures thereof. It is to be understood that, unless the filler adds to the strength, stiffness and impact strength of the composition, it is only a filler and not a reinforcing filler as contemplated herein.

Although it is only necessary to have at least a reinforcing amount of the reinforcement present, in general, the combination of polyester components (a) and (b) will comprise from about 1 to about 80 parts by weight of the total composition.

In particular, the preferred reinforcing fillers are of glass and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastics reinforcement are made by mechanical pulling. The filament diameters range from about 0.00012 to 0.00075 inch, but this is not critical to the present invention.

The length of the glass filaments and whether or not they are bundled into fibers and the fibers bundled in turn to yarns, ropes or rovings, or woven into mats, and the like, are also not critical to the invention. However, in preparing the present compositions, it is convenient to use the filamentous glass in the form of chopped strands of from about ⅛ inch to about 1 inch long, preferably less than ¼ inch long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.000005 and 0.125 (⅛) inch.

In general, best properties will be obtained if the sized filamentous glass reinforcement comprises from about 1 to about 80 percent by weight based on the combined weight of glass and polyesters and preferably from about 5 to about 50 percent by weight. Especially preferably the glass will comprise from about 10 to about 40 percent by weight based on the combined weight of glass and resins. Generally, for direct molding use, up to about 60 percent of glass can be present without causing flow problems. However, it is useful also to prepare the compositions containing substantially greater quantities, e.g., up to 70–80 percent by weight of glass. These concentrates can then be custom blended with blends of resins that are not glass reinforced to provide any desired glass content of a lower value.

The hydroxybenzotriazole compounds which may be employed are selected from the formula:

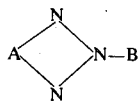

wherein A represents an o-phenylene radical bound by two neighboring carbon atoms to two nitrogen atoms of the triazole ring, and B represents a phenyl radical which contains in the 2-position an OH group and in further positions a member selected from the group consisting of H, lower alkyl, lower alkoxy, lower carbalkoxy, cyclohexyl, phenyl and halogen.

Also other compounds of this type may be found in U.S. Pat. No. 3,189,615 which is hereby incorporated by reference.

Examples of compounds of this type include 2-(2'-hydroxy-5'-methylphenyl) benzotriazole; 2-(3'-tert-butyl-2'-hydroxy-5'-methylphenyl)-5'-chlorobenzotriazole; 2-(3',5'-di-tert-butyl-2'-hydroxyphenyl)-5-chlorobenzotriazole; 2-[3',5'-di-(tert-butyl)-2'-hydroxy-phenyl] benzotriazole and 2-(2'-hydroxy-3', 5'-di-tert-amyl phenyl) benzotriazole. A stabilizing amount of the hydroxybenzotriazole ultraviolet light absorbers are employed in the practice of this invention. This amount is from about 0.25 to 3.0 weight percent.

It is another preferred feature of this invention also to provide flame retardant thermoplastic compositions, as defined above, because the polyesters are normally flammable, the compositions also including a flame retardant additive in a minor proportion but in an amount at least sufficient to render the polyester resin non-burning or self-extinguishing.

When used herein, the terms "non-burning", "self-extinguishing" and "non-dripping" are used to describe compositions which meet the standards of Underwriter's Laboratories Bulletin No. 94.

The flame-retardant additives useful in this invention comprise a family of chemical compounds well known to those skilled in the art. Generally speaking, the more important of these compounds contain chemical elements employed for their ability to impart flame resistance, e.g., bromine, chlorine, antimony, phosphorus and nitrogen. It is preferred that the flame-retardant additive comprise a halogenated organic compound (brominated or chlorinated); a halogen-containing organic compound in admixture with an organic or inorganic antimony compound, e.g., antimony oxide; elemental phosphorus or a phosphorus compound; a halogen-containing compound in admixture with a phosphorus compound or compounds containing phosphorus-nitrogen bonds or a mixture of two or more of the foregoing.

The amount of flame-retardant additive used is not critical to the invention, so long as it is present in a minor proportion based on said composition--major proportions will detract from physical properties. Those skilled in the art are well aware that the amount will vary with the nature of the polymers in the blend and with the efficiency of the additive. In general, however, the amount of additive will be from 0.5 to 50 parts by weight per hundred parts of resin. A preferred range will be from about 3 to 25 parts and an especially preferred range will be from about 5 to 15 parts of additive per 100 parts of resin. Smaller amounts of compounds highly concentrated in the elements responsible for flame-retardance will be sufficient, e.g., elemental red phosphorus will be preferred at 0.5 to 10 parts by weight per hundred parts of resin while phosphorus in the form of triphenyl phosphate will be used at 5 to 25 parts of phosphate per part of resin and so forth. Halogenated aromatics will be used at 2 to 20 parts and synergists, e.g., inorganic or organic antimony compounds, such as antimony oxide, will be used at about 1 to 10 parts by weight per 100 parts of resin.

Among the useful halogen-containing compounds are those of the formula

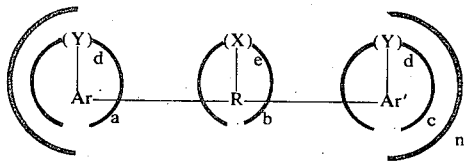

wherein $n$ is 1 to 10 and R is an alkylene, alkylidene or cycloaliphatic linkage, e.g., methylene, ethylene, propylene, isopropylene, isopropylidene, butylene, isobutylene, amylene, cyclohexylene, cyclopentylidene, and the like: a linkage selected from the group consisting of ether; carbonyl; a sulfur-containing linkage, e.g., sulfide, sulfoxide, sulfone, thiocarbonate; a phosphorus-containing linkage, and the like. R can also consist of two or more alkylene or alkylidene linkages connected by such groups as aromatic, ether, ester, carbonyl, sulfide, sulfoxide, sulfone, a phosphorus-containing linkage, and the like. R can be derived from a dihydric phenol, e.g., bisphenol-A, and the like. Other groups which are represented by R will occur to those skilled in the art.

Ar and Ar' are mono- or polycarbocyclic aromatic groups such as phenylene, biphenylene, terphenylene, naphthylene, and the like. Ar and Ar' may be the same or different.

Y is a substituent selected from the group consisting of organic, inorganic or organometallic radicals. The substituents represented by Y include (1) halogen, e.g., chlorine, bromine, iodine, or fluorine or (2) hydroxy or ether groups of the general formula OE, wherein E is hydrogen or a monovalent hydrocarbon radical similar to X or (3) monovalent hydrocarbon groups of the type represented by R or (4) other substituents, e.g., cyano, etc., said substituents being essentially inert provided there be at least one and preferably two halogen atoms per aryl, e.g., phenyl, nucleus.

X is a monovalent hydrocarbon group exemplified by the following: alkyl, such as methyl, ethyl, propyl, isopropyl, butyl, decyl, and the like; aryl groups, such as phenyl, naphthyl, biphenyl, xylyl, tolyl, and the like; aralkyl groups, such as benzyl, ethylphenyl, and the like; cycloaliphatic groups, such as cyclopentyl, cyclohexyl, and the like; as well as monovalent hydrocarbon groups containing inert substituents therein. It will be understood that where more than one X is used they may be alike or different.

The letter $d$ represents a whole number ranging from 1 to a maximum equivalent to the number of replaceable hydrogens substituted on the aromatic rings comprising Ar or Ar'. The letter $e$ represents a whole number ranging from 0 to a maximum controlled by the number of replaceable hydrogens on R. The letters $a$, $b$, and $c$ represent whole numbers including 0. When $b$ is not 0, neither $a$ nor $c$ may be 0. Otherwise either $a$ or $c$, but not both, may be 0. Where $b$ is 0, the aromatic groups are joined by a direct carbon-to-carbon bond.

The Y substituents on the aromatic groups, Ar and Ar' can be varied in the ortho, meta or para positions on the aromatic rings and the groups can be in any possible geometric relationship with respect to one another.

Included within the scope of the bisphenols included in the above formula are the following:

2,2-bis (4-hydroxy, 3,5-dichlorophenyl)propane
bis (4-hydroxy, 3-chlorophenyl)methane
bis (4-hydroxy, 3,5-dibromophenyl)methane
1,2-bis (4-hydroxy, 3,5-dichlorophenyl)ethane
1,1-bis (4-hydroxy, 3,5-dichlorophenyl)ethane
3,3-bis (4-hydroxy, 3,5-dichlorophenyl)pentane
bis (4-hydroxy, 3,5-dichlorophenyl)cyclohexylmethane The preparation of these and other applicable bisphenols are known in the art. In place of the divalent aliphatic group in the above examples may be substituted sulfide, sulfoxy and the like.

Included within the above structural formula are substituted benzenes exemplified by tetrabromobenzene, hexachlorobenzene, hexabromobenzene, and biphenyls such as 2,2'-dichlorobiphenyl, 2,4'-dibromobiphenyl, 2,4'-dichlorobiphenyl, hexabromobiphenyl, octabromobiphenyl, decabromobiphenyl and halogenated diphenyl ethers, containing 2 to 10 halogen atoms.

Preferred halogen compounds for this invention are aromatic halogen compounds such as chlorinated benzenes, brominated benzenes, chlorinated biphenyls, chlorinated terphenyls, brominated biphenyls, brominated biphenols, brominated terphenyls or compounds comprising two phenyl radicals separated by a divalent alkylene group and having at least two chlorine or bromine atoms per phenyl nucleus, and mixtures of at least two of the foregoing. Halogenated bis-imides are also useful.

Especially preferred are hexabromobenzene and chlorinated biphenyls or terphenyls, alone or mixed with antimony oxide.

In general, the preferred phosphate compounds are selected from elemental phosphorus or organic phosphonic acids, phosphonates, phosphinates, phosphonites, phosphinites, phosphene oxides, phosphenes, phosphites or phosphates. Illustrative is triphenyl phosphine oxide. These can be used alone or mixed with hexabromobenzene or a chlorinated biphenyl and, optionally, antimony oxide.

Typical of the preferred phosphorus compounds to be employed in this invention would be those having the general formula

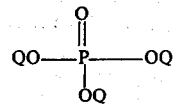

and nitrogen analogs thereof where each Q represents the same or different radicals including hydrocarbon radicals such as alkyl, cycloalky, aryl, alkyl substituted aryl and aryl substituted alkyl; halogen; hydrogen and combinations thereof provided that at least one of said Q's is aryl. Typical examples of suitable phosphates include, phenylbisdodecyl phosphate, phenylbisneopentyl phosphate, phenylethylene hydrogen phosphate, phenylbis (3,5,5'-trimethylhexyl phosphate), ethyldiphenyl phosphate, 2-ethylhexyl di(p-tolyl) phosphate, diphenyl hydrogen phosphate, bis (2-ethylhexyl) p-tolyphosphate, tritolyl phosphate, bis (2-ethylhexyl)-phenyl phosphate, tri(nonylphenyl) phosphate, phenylmethyl hydrogen phosphate, di(dodecyl) p-tolyl phosphate, tricresyl phosphate, triphenyl phosphate, halogenated triphenyl phosphate, dibutylphenyl phosphate, 2-chloroethyldiphenyl phosphate, p-tolyl bis (2,5,5'-trimethylhexyl)phosphate, 2-ethylhexyldiphenyl phosphate, diphenyl hydrogen phosphate, and the like. The preferred phsophates are those where each Q is aryl. The most preferred phosphate is triphenyl phosphate. It is also preferred to use triphenyl phosphate in combination with hexabromobenzene and, optionally, antimony oxide.

Also suitable as flame-retardant additives for this invention are compounds containing phosphorus-nitrogen bonds, such as phosphonitrilic chloride, phosphorus ester amides, phosphoric acid amides, phosphonic acid amides, phosphinic acid amides, tris(aziridinyl)-phosphine oxide or tetrakis (hydroxymethyl)phosphonium chloride. These flame-retardant additives are commercially available.

A preferred flame-retardant additive of this invention is a copolycarbonate which is derived from a halogen-substituted dihydric phenol and a dihydric phenol, said halogen preferably being chlorine or bromine. Preferably, this copolycarbonate is the product of a halogenated bisphenol-A such as tetrabromobisphenol-A and tetrachlorobisphenol-A and a dihydric phenol such as bisphenol-A. Preferably, this copolycarbonate consists of 75 to 25 weight percent of the product of tetrabromobisphenol-A and, correspondingly, 25 to 75 weight percent of the product of bisphenol-A based on the weight of the copolycarbonate. The preparation of this copolycarbonate is set forth in U.S. Pat. No. 3,334,154 which is incorporated herein by reference.

Particularly preferred flame-retardant additives for use in this invention are low molecular weight polymers of a carbonate of a halogenated dihydric phenol. Preferred such polymers contain from 2 to 10 repeating units of the formula

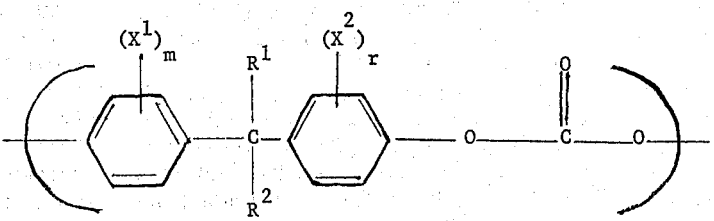

wherein $R^1$ and $R_2$ are hydrogen, (lower)alkyl or phenyl, $X^1$ and $X^2$ are bromo or chloro and $m$ and $r$ are from 1 to 4. The polymeric additives will have a low volatility when heated above 200°C., and a softening point of less than about 300°C. They will be used alone or in combination with synergists, such as inorganic or organic antimony-containing compounds.

These polymeric additives can be made by polymerizing a mixture of a halogenated dihydric phenol and a chain stopper, e.g., an alcohol, carboxylic acid, carboxylic acid halide or, preferably a monohydric phenol, and most preferably a halogenated phenol and phosgene or a reactive derivative thereof in the presence of an acid acceptor, e.g., an amine or caustic. Details concerning the preparation and use of such compounds are given in the copending patent application of Daniel W. Fox, "Flame Retardant Compounds and Thermoplastic Compositions Containing the Same" Ser. No. 194,518, filed on Nov. 1, 1971 and incorporated herein by reference.

The most preferred such additive can be made by polymerizing a mixture of tetrabromobisphenol-A and 2,4,6'tribromophenol with phosgene in either methylene chloride in the presence of pyridine or in methylene chloride containing triethylamine in admixture with an aqueous caustic phase. The product of such a process will be a polymer of the formula:

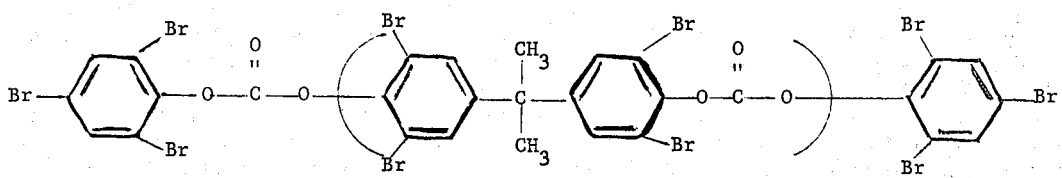

wherein the average number of repeating units, $n$, will be from about 3 to about 7, and the softening point will be in the range of from 200° to 260°C.

The preferred polymeric additives can be used within the concentration ranges specified above for the halogenated compounds in general, but preferably will be used in amounts of from about 5 to about 25 parts by weight per 100 parts by weight of the flammable polyester resinous components in the composition.

Inorganic and organic antimony compounds are widely available or can be made in known ways. In preferred embodiments, the type of antimony compound used is not critical, being a choice primarily based on economics. For example, as inorganic antimony compounds there can be used antimony oxide ($Sb_2O_3$); antimony phosphate; $KSb(OH)_6$; $NH_4SbF_6$; $SbS_3$; and the like. A wide variety of organic antimony compounds can also be used, such as antimony esters with organic acids; cyclic alkyl antimonites; aryl antimonic acids, and the like. Illustrative of the organic antimony compounds, including inorganic salts of such compounds are: KSb tartrate, Sb caproate; $Sb(OCH_2CH_3)_3$; $Sb(OCH(CH_3)CH_2CH_3)_3$; Sb polymethylene glycolate; triphenyl antimony; and the like. Especially preferred is antimony oxide.

The method of blending the compositions of this invention is not critical and can be carried out by conventional techniques. One convenient method comprises blending the polyesters reinforcing filler and the stabilizer in powder or granular form, extruding the blend and comminuting into pellets or other suitable shapes. Alternately, the stabilizer may be added to the product still in the polymerization reactor immediately prior to removal of the molten product from the reactor.

The other additives, if used, are added in any usual manner, e.g., by dry mixing or by mixing in the melted state in an extruder, on a heated mill or in other mixers.

By way of illustration, glass roving (a bundle of strands of filaments) is chopped into small pieces, e.g., ⅛ to 1 inch in length, and preferably less than ¼ inch in length and put into an extrusion compounder with the polyester resin and the stabilizer and, optionally, other additive(s) to produce molding pellets. The fibers are shortened and predispersed in the process, coming out at less than 1/16 inch long. In another procedure, glass filaments are ground or milled to short lengths, and are mixed with the polyester resin and stabilizers, and, optionally, other additive(s), by dry blending then either fluxed on a mill and ground, or they are extruded and chopped. The glass fivers can also be mixed with resin and additives and directly molded, e.g., by injection or transfer molding techniques.

It is always important to thoroughly free all of the ingredients, the polyester resin, stabilizers, reinforcing filler, if used, form as much water as possible.

In addition, compounding should be carried out to insure that the residence time in the machine is short; the temperature is carefully controlled; the friction heat is utilized; and an intimate blend between the resin and the additives is obtained.

Although it is not essential, best results are obtained if the ingredients are precompounded, pelletized and then molded. Precompounding can be carried out in conventional equipment. For example, after carefully predrying the polyester resins, the stabilizers and, optionally, other additives and/or reinforcements, e.g., under vacuum at 110°C for 12 hours, a single screw extruder is fed with a dry blend of the ingredients, the screw employed having a long transition section to insure proper melting. On the other hand, a twin screw extrusion machine, e.g., a 28 mm. Werner Pfleiderer machine can be fed with resins and additives at the feed port and reinforcement down stream. In either case, a generally suitable machine temperature will be about 300° to 600°F.

The precompounded composition can be extruded and cut or chopped into molding compounds, such as conventional granules, pellets, etc. by standard techniques.

The compositions can be molded in any equipment conventionally used for thermoplastic compositions. For example, good results will be obtained in an injection molding machine, e.g., of the Newbury type, with conventional cylinder termperatures, e.g., 500°F. and conventional mold temperatures, e.g., 150°F. If necessary, depending on the molding properties of the polyester, the amount of additives and/or reinforcing filler and the rate of crystallization of the polyester component, those skilled in the art will be able to make the conventional adjustments in molding cycles to accommodate the composition.

The compositions of this invention may be used alone as molding powders or mixed with other polymers and may contain additional, non-reinforcing fillers, such as wood flour, cloth fibers, clays and the like, as well as pigments, dyes, stabilizers, plasticizers, and the like.

DESCRIPTION OF THE PREFERRED EMBODIMENTS

The following examples illustrate the preparation of certain compositions within the scope of this invention. They are not to be construed to limit the invention in any manner whatsoever. All parts, except as otherwise indicated, ar by weight.

EXAMPLE I

In a single screw extruder operated at between 450° to 600°F but preferably at 480°F, are blended 69.8 parts by weight of unstabilized poly(1,4-butylene terephthalate) having a melt viscosity range of 1000–16,000 poise preferably 2300–3800 poise, 30 parts by weight of ⅛ inch glass fibers, 0.15 parts by weight of Irganox 1093, (Ciba-Geigy) 0.05 parts by weight of Ferro 904 (Ferro, Co.). The extrudant was chopped into pellet form. The pelletized composition is dried for 24 hours at 240°–260°F in an air circulating over, then injection molded in a 3 oz. Van Dorn reciprocating screw type injection molding machine into ASTM test pieces.

EXAMPLE II

The following reinforced stabilized composition is prepared according to the method of Example I:
 68.8 parts of poly(1,4-butylene terephthalate)
 30.0 parts of ⅛ inch glass fiber
 0.15 parts of Irganox 1093
 0.05 parts of Ferro 904
 1.0 part of 2-(2'-hydroxy-3', 5'-di-tert-amyl phenyl) benzotriazole

EXAMPLE III

The following reinforced flame retardant composition is prepared according to the method of Example I:
 52.3 parts of poly(1,4-butylene terephthalate)
 29.7 parts of ⅛ inch glass fiber
 12.9 parts of a copolymer of bisphenol-A and tetrabromo bisphenol-A at 65:35 molar base ratio
 4.9 parts of Sb$_2$O$_3$ (antimony oxide)
 0.15 parts of Irganox 1093
 0.05 parts of Ferro 904

EXAMPLE IV

The following reinforced flame retardant composition is prepared according to the method of Example I:
 52.3 parts of poly(1,4-butylene terephthalate)
 29.7 parts of ⅛ inch glass fiber
 12.9 parts of copolymer of bisphenol-A and tetrabromo bisphenol-A at 65:35 molar base ratio
 4.9 parts of Sb$_2$O$_3$ (antimony oxide)
 0.15 parts of Irganox 1093
 0.05
 1.0 part of 2-(2'-hydroxy-3',5'-di-tert-amyl phenyl) benzotriazole

EXAMPLE V

The following flame retardant composition is prepared according to the method of Example I:
 68.8 parts of poly(1,4-butylene terephthalate)
 26.0 parts of copolymer of bisphenol-A and tetrabromo bisphenol-A at 65:35 molar base ratio
 5.0 parts of Sb$_2$O$_3$ (antimony oxide)
 0.15 parts of Irganox 1093
 0.05 parts of Ferro 904

EXAMPLE VI

The following stabilized flame retardant composition is prepared according to the method of Example I:
 67.8 parts of poly(1,4-butylene terephthalate)
 26.0 parts of a copolymer of bisphenol-A and tetrabromo bisphenol-A at 65:35 molar base ratio
 5.0 parts of Sb$_2$O$_3$ (antimony oxide)
 0.15 parts of Irganox 1093
 0.05 parts of Ferro 904
 1.0 part of 2-(2'-hydroxy-3', 5'-di-tert-amyl phenyl) benzotriazole The ASTM test pieces molded from the composition of Examples I through VI are subjected to physical property tests after exposure to ultraviolet black light sun lamps at 168, 504, and 1008 hours. Tensile strength and elongation at break are measured according to ASTM D-638. The Gardner Impace Strengths are measured by the Falling Dart test method.

The results are summarized in the TABLE.

TABLE

| EXAMPLE | I* | II | III* | IV | V* | VI |
|---|---|---|---|---|---|---|
| % Retention of Tensile Strength after exposure, hrs. | | | | | | |
| 168 hrs. | 100 | 100 | 92 | 98 | 100 | 100 |
| 504 hrs. | 96 | 100 | 94 | 98 | 100 | 100 |
| 1008 hrs. | 96 | 100 | 94 | 98 | 100 | 100 |
| % Retention of Elongation at Break after exposure, hrs. | | | | | | |
| 168 hrs. | 90 | 100 | 100 | 100 | 80 | 90 |
| 504 hrs. | 90 | 100 | 100 | 100 | 40 | 83 |
| 1008 hrs. | 80 | 93 | 100 | 90 | 15 | 80 |
| Gardner Impact, in-lbs. after exposure, hrs. | | | | | | |
| 168 hrs. | — | — | — | — | 440 | 440 |
| 504 hrs. | — | — | — | — | 340 | 420 |
| 1008 hrs. | — | — | — | — | 150 | 300 |

*Control - no stabilizer

From a review of the data, it can be seen that the effect of the stabilizer provides an unexpectedly high degree of stabilization in the polyester composition.

Other polymers, flame-retardant additions, reinforcing fillers, benzotriazoles within the scope of this invention may be substituted for those of the Examples with similar results.

Obviously, other modifications and variations of the present invention are possible in the light of the above teachings. It is, therefore, to be understood that changes may be made in the particular embodiments of this invention described which are within the full intended scope of the invention as defined by the appended claims.

What is claimed is:

1. A stabilized polyester composition consisting essentially of
   a. a high molecular weight polyester resin;
   b. a flame retardant additive in minor proportion but in an amount at least sufficient to render the polyester resin non-burning or self-estinguishing.
   c. a stabilizing amount of a hydroxybenzotrianzole selected from compounds of the formula:

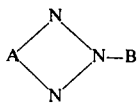

wherein A represents an o-phenylene radical bound by two neighboring carbon atoms to two nitrogen atoms of the triazole ring, and B represents a phenyl radical which contains in the 2-position an OH group and in further positions a member selected from the group consisting of H, lower alkyl, lower alkoxy, lower carbalkoxy, cyclohexyl, phenyl and halogen.

2. The composition as defined in claim 1 wherein the polyester resin includes repeating units of the formula:

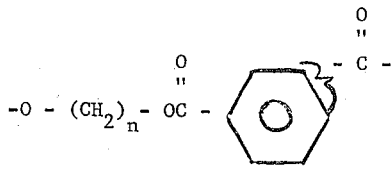

wherein n is 2 to 6.

3. The composition as defined in claim 2 wherein said polyester is poly(ethylene terephthalate).

4. The composition as defined in claim 2 wherein said polyester is poly(1,4-butylene terephathalate).

5. The composition as defined in claim 1 wherein the polyester resin is a combination of a poly(ethylene terephthalate) resin and a poly(butylene terephthalate) resin or copolyesters thereof.

6. The composition as defined in claim 5 wherein the polyester resin combination comprises:

a. from about 1 to about 99 parts by weight of a poly(ethylene terephthalate) resin and
b. from about 99 to about 1 part by weight of a poly(1,4-butylene terephthalate) resin or a copolyesteer thereof formed with a minor amount of an aliphatic or aromatic dicarboxylic acid or an aliphatic polyol.

7. The composition as defined in claim 1 wherein the polyester resin is a combination of a poly(1,4-butylene terephthalate) resin or a copolyester thereof and a linear aliphatic polyester resin; said copolyester formed with a minor amount of an aliphatic or aromatic dicarboxylic acid or an sliphatic polyol.

8. The composition as defined in claim 7 wherein the polyester combinarion comprises:

a. from about 99 to about 60 parts by weight of a poly(1,4-butylene terephthalate) resin or a copolyester thereof with a minor amount of an aliphatic or aromatic dicarboxylic acid or aliphatic polyol and
b. from about 1 to about 40 parts by weight of alinear aliphatic polyester resin.

9. The composition as defined in claim 8 wherein component (a) is a poly(1,4-butylene terephthalate) resin.

10. The composition as defined in claim 8 wherein the linear aliphatic polyester resin component (b) is poly(betapropiolactone), poly (gammabutyrolactone), poly(deltavalerolactone), poly(epsiloncaprolactone) or a mixture of at least two of the foregoing.

11. The composition as defined in claim 1 wherein the polyester resin contains units providing branching sites and is derived from compounds containing at least three ester forming groups.

12. The composition as defined in cliam 1 wherein the hydroxybenzotriazole is 2-(2'-hydroxy-3', 5'-di-tert-amyl phenyl) benzotriazole.

13. A composition as defined in claim 1 wherein the flame retardant additive is a halogen-containing compound; a halogen-containing compound is admixture with antimony oxide; elemental phosphorus or a phosphorus compound; a halogen-containing compound in admixture with a phosphorus compound; a compound containing phosphorus-nitrogen bonds; or a mixture of the foregoing, and said compound is present in an amount of from 0.5 to 50 parts by weight per hundred parts resin.

14. A composition as defined in claim 1 wherein said flame retardant additive is selected from the group consisting of elemental phosphorus; organic phosphonic acids, phosphonates, phosphinates, phosphonites, phosphinites, phosphine oxides, phosphines, phosphites, phosphates and mixtures of any of the foregoing.

15. A flame retardant composition as defined in claim 1 wherein said flame retardant additive is either
   a. a low molecular weight polymer of a carbonate of a halogenated dihydric phenol, said polymer containing from 2 to 10 repeating units of the formula

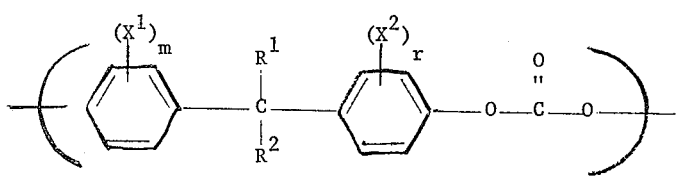

wherein R¹ and R² are hydrogen, (lower) alkyl or phenyl, X¹ and X² are bromo or chloro and m and r are from 1 to 4, said polymer having low volatility when heated above about 200°C., and a softening point of less than about 300°C. or b. a combination of said polymer (a) and an inorganic or organic antimony-containing compound.

16. A flame retardant composition as defined in claim 15 wherein said low molecular weight polymer (a) is of the formula

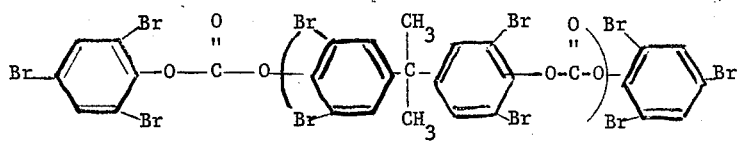

wherein the average number of repeating units, n, is from about 3 to 7, and the softening point of said polymer is in the range of from 200° to 260°C.

17. A flame retardant composition as defined in claim 1 wherein said flame retardant additive is either
   a. a carbonate polymer which is the reaction product of a halogen substituted dihydric phenol and a dihydric phenol or
   b. a combination of said polymer (a) and an inorganic or organic antimony-containing compound.

18. A flame retardant composition as defined in claim 17 wherein said carbonate polymer is the reaction product of a halogenated bisphenol-A and bisphenol-A.

19. The composition as defined in claim 1 which also includes a reinforcing amount of a reinforcing filler.

20. A composition as defined in claim 19 wherein said reinforcing filler is selected from the group consisting of reinforcing metals, ceramics, silicas, quartz, glass and carbons.

21. A composition as defined in claim 20 wherein said reinforcing filler if filamentous glass, in an amount of from about 1 to about 50 percent by weight.

22. A stabilized polyester composition consisting essentially of
   a. a high molecular weight polyester resin;
   b. a reinforcing amount of a reinforcing filler; and
   c. a stabilizing amount of a hydroxybenzotriazole selected from compounds of the formula:

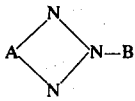

wherein A represents an o-phenylene radical bound by two neighboring carbon atoms to two nitrogen atoms of the triazole ring, and B represents a phenyl radical which contains in the 2-position an OH group and in further position a member selected from the group consisting of H, lower alkyl, lower alkoxy, lower carbalkoxy, cyclohexyl, phenyl and halogen.

23. The composition as defined in claim 22 wherein the polyester resin includes repeating units of the formula:

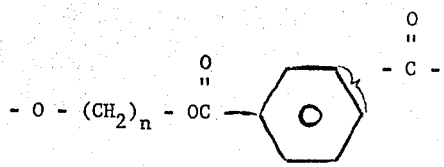

wherein n is 2 to 6.

24. The composition as defined in claim 22 wherein said polyester is poly(ethylene terephthalate).

25. The composition as defined in claim 22 wherein said polyester is poly(1,4-butylene terephthalate).

26. The composition as defined in claim 22 wherein the polyester resin is a combination of a poly(ethylene terephthalate) resin and a poly(butylene terephthalate) resin or copolyesters thereof.

27. The composition as defined in claim 26 wherein the polyester resin combination comprises:
   a. from about 1 to about 99 parts by weight of a poly(ethylene terephthalate) resin and
   b. from about 99 to about 1 part by weight of a poly(1,4butylene terephathalate) resin or a copolyester thereof formed with a minor amount of an aliphatic or aromatic dicarboxylic acid or an aliphatic polyol.

28. The composition as defined in claim 22 wherein the polyester resin is a combination of a poly(1,4-butylene terephthalate) resin or a copolyester thereof and a linear aliphatic polyester resin; said copolyester formed with a minor amount of an aliphatic or aromatic dicarboxylic acid or an aliphatic polyol.

29. The composition as defined in claim 28 wherein the polyester combination comprises:
   a. from about 99 to about 60 parts by weight of poly(1,4-butylene terephthalate) resin or a copolyester thereof with a minor amount of an aliphatic or aromatic dicarboxylic acid or an aliphatic polyol and
   b. from about 1 to about 40 parts by weight of a linear aliphatic polyester resin.

30. The composition as defined in claim 29 wherein component (a) is a poly(1,4-butylene terephthalate) resin.

31. The composition as defined in claim 29 wherein the linear aliphatic polyester resin component (b) is poly(betapropiolactone), poly (gammabutyrolactone), poly(deltavalerolactone, poly(epsiloncaprolactone) or a mixture of at least two of the foregoing.

32. The composition as defined in claim 22 wherein the polyester resin contains units providing branching sites and derived from compounds containing at least three ester forming groups.

33. A composition as defined in claim 22 wherein said reinforcing filler is selected from the group consisting of reinforcing metals, ceramics, silicas, quartz, glass and carbons.

34. A composition as defined in claim 33 wherein said reinforcing filler is filamentous glass, in an amount of from about 1 to about 50 percent by weight based on the combined weight of components (a) and (b) and the glass.

35. The composition as defined in claim 22 wherein the hydroxybenzotriazole is 2-(2'-hydroxy-3',5'-di-tert-amyl phenyl) benzotriazole.

* * * * *